United States Patent [19]

Sorce et al.

[11] 4,128,451
[45] Dec. 5, 1978

[54] ROLLER MEMBERS FOR USE IN HEAT SEALING APPARATUS

[75] Inventors: Peter S. Sorce, Tonawanda; Earl W. Clifford, Getzville, both of N.Y.

[73] Assignee: The Aro Corporation, Bryan, Ohio

[21] Appl. No.: 784,283

[22] Filed: Apr. 4, 1977

[51] Int. Cl.² .................. B31F 5/00; B32B 31/00; B30B 15/34
[52] U.S. Cl. ..................... 156/555; 156/582; 156/583; 219/244
[58] Field of Search ............... 156/582, 583, 581, 555; 219/244

[56] References Cited

U.S. PATENT DOCUMENTS

| | | | |
|---|---|---|---|
| 1,592,975 | 7/1926 | Hearne | 219/244 |
| 2,387,631 | 10/1945 | Weir | 156/555 |
| 2,401,820 | 6/1946 | Fairley | 219/244 |
| 2,615,113 | 10/1952 | Frye | 219/244 |

Primary Examiner—Douglas J. Drummond
Attorney, Agent, or Firm—Sommer & Sommer

[57] ABSTRACT

Apparatus for heat sealing a thermally-sensitive material to a substrate material includes a frame, and a pair of internally heated shafts mounted fast on the frame. A roller member is rotatably mounted on each shaft, and is arranged to be heated by the heating element within the shaft. The rollers are rotated in opposite angular directions so that an object interposed at the nip will be translated therebetween. The facing peripheral portions of each roller member have a sinusoidal cross-section, with the peaks of one roller member being aligned with the valleys of the other. The roller members are spaced from one another to provide a degree of frictional resistance with the materials to be bonded together. The cross-sectional configuration in the roller members serves to provide a plurality of ribbon-like seals between the materials, without propagating a bubble as such materials are passed between the roller members.

9 Claims, 9 Drawing Figures

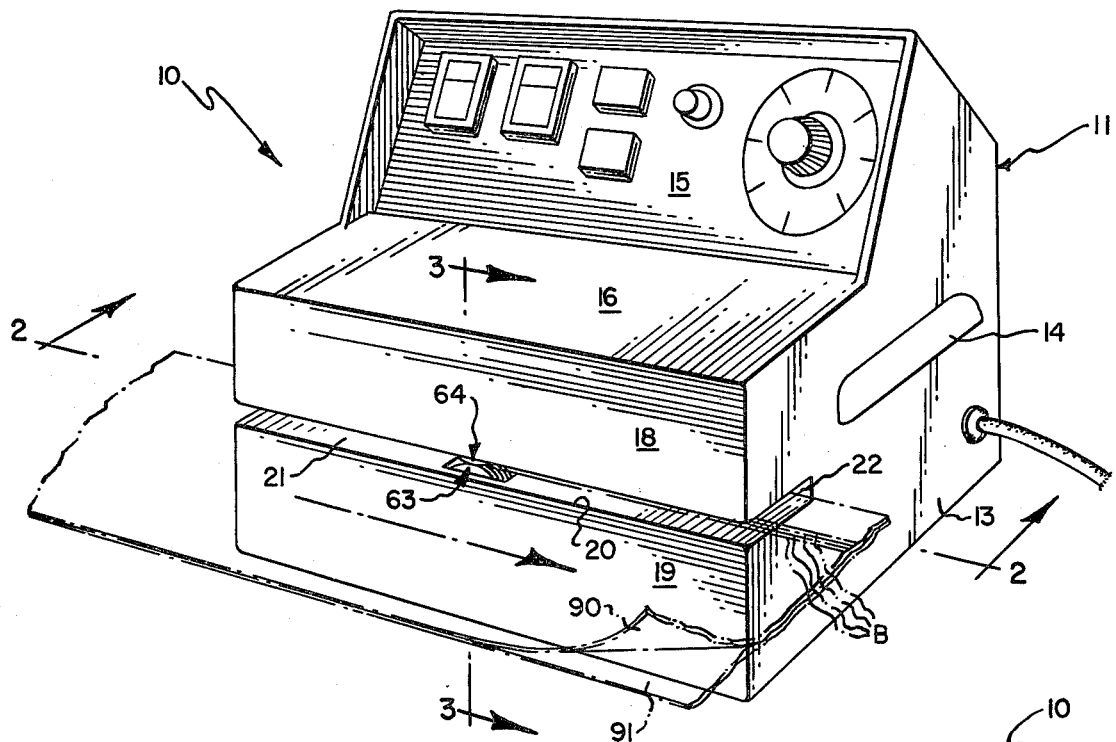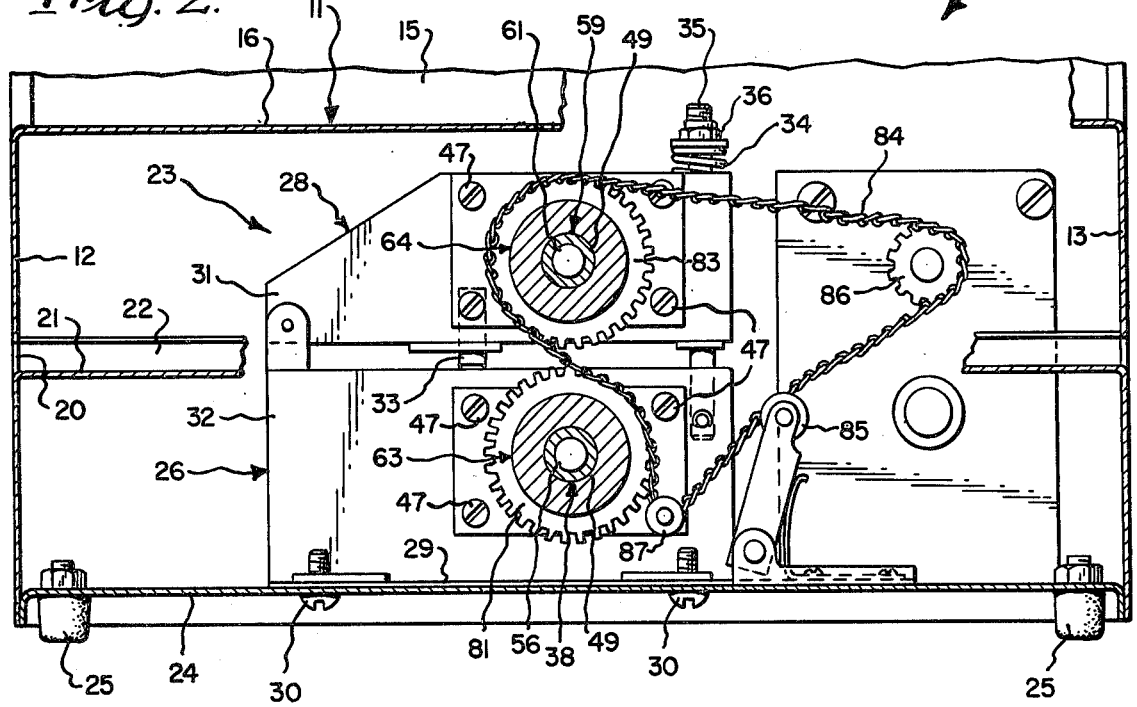

4,128,451

ROLLER MEMBERS FOR USE IN HEAT SEALING APPARATUS

BACKGROUND OF THE INVENTION

1. Field of the Invention

The present invention relates generally to apparatus for heat sealing a thermally-sensitive material to an underlying substrate material, and more particularly to apparatus for closing bags containing sterilized surgical instruments and the like.

2. Description of the Prior Art

In some medical applications, sterilized surgical instruments and the like are often stored in protective bags having a sheet of mylar perimetically bonded to an underlying sheet of treated paper. The treated paper is permeable to ethylene oxide, which gas may be used to sterilize the instruments after the package has been sealed.

However, many surgical instruments are reusable, and must be repackaged after treatment in an autoclave. The packaging material may be supplied in the form of a rolled tube, the open ends of which must be sealed. While many types of heat sealing apparatus have been developed, the prior art type employing one or more heated rollers has been plagued with the problem of at least one of the rollers propagating an air bubble in advance of the roller. The presence of this bubble may impede or impair the integrity of the seal being formed. While in many packaging applications, such a faulty seal might not be critical, it is important to maintain the sealing integrity of a package containing sterilized surgical instruments or supplies.

SUMMARY OF THE INVENTION

The present invention provides an improved roller member for use in apparatus for heat sealing a thermally-sensitive material to a substrate material. Such apparatus normally has a frame, a tubular first shaft mounted fast on the frame, and a first heating element arranged within the first shaft.

The improvement comprises a first roller member rotatably mounted on the first shaft and having an outer peripheral surface, preferably cylindrical, provided with at least one annular groove extending radially into the roller member from such peripheral surface, thereby to localize the heat transferred from the roller member peripheral surface to the materials to be bonded together. Any member of such grooves may be provided, and such grooves may have a rectangular, U-shaped, or concave cross-section, as desired.

The apparatus may have a second tubular shaft mounted fast to the frame and arranged to be heated by a second heating element arranged therewithin. In this form, the improvement may include a second roller member having a second outer peripheral surface arranged to face the outer peripheral surface of the first roller member. In this form, each of the roller members may be provided with one or more annular grooves extending radially into the roller member from its operative peripheral surface. However, the peaks of one roller member are aligned with the valleys of the other roller member to localize the heat transferred to the thermally-sensitive material.

Accordingly, one general object is to provide one or more improved roller members for use in apparatus for heat sealing a thermally-sensitive material to a substrate material.

Another object is to provide one or more improved roller members for such apparatus, which roller members do not tend to advance an air bubble ahead of the areas being sealed.

Another and more specific object is to provide an improved pair of cooperative roller members for use in heat sealing apparatus for closing bags containing sterilized surgical instruments and the like.

These and other objects and advantages will become apparent from the foregoing and ongoing specification, the drawings, and the appended claims.

BRIEF DESCRIPTION OF THE DRAWINGS

FIG. 1 is a perspective exterior view of a heat sealer apparatus incorporating the inventive roller members, this view showing a thermally-sensitive material and a substrate material being translated rightwardly between the heated roller members to provide four ribbon-like seals between such materials.

FIG. 2 is an enlarged fragmentary vertical sectional view thereof, taken generally on line 2—2 of FIG. 1, and principally showing the upper and lower frame portions, and the ladder chain operatively arranged to rotate the roller members in opposite angular directions so that material interposed at the nip between the roller members may be translated therebetween.

DESCRIPTION OF THE PREFERRED EMBODIMENTS

Figure 3:
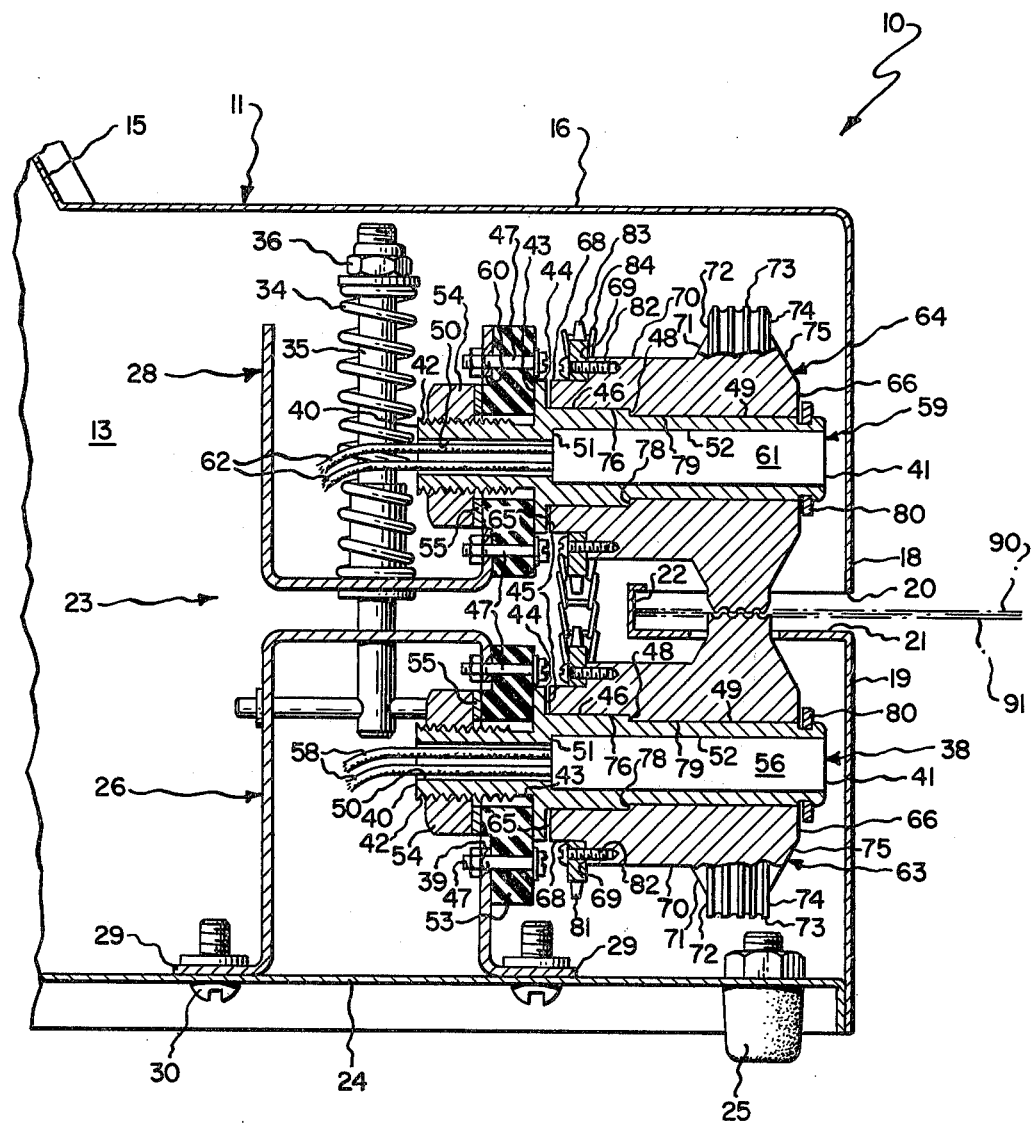
FIG. 3 is a further enlarged fragmentary vertical sectional view thereof taken generally on line 3—3 of FIG. 1, this view principally showing the first and second roller members, and the manner by which the first and second shafts are mounted on the stationary and movable frame portions.

At the outset, it should be clearly understood that like reference numerals are intended to identify the same elements and/or structure consistently throughout the several drawing figures, as such elements and/or structure may be further described or explained by the entire written specification of which this detailed description is an integral part.

The present invention provides improvements in apparatus, generally indicated at 10, for heat sealing or locally bonding a thermally-sensitive material to a substrate material. Such apparatus is more fully shown and described in our prior U.S. Pat. application Ser. No. 502,168, filed Aug. 30, 1974, and now abandoned. However, the entire disclosure of our prior application is hereby incorporated by reference to amplify the description of the structure and operation of apparatus 10. Of course, to the extent that there may be inconsistencies between this specification and the specification of our aforesaid prior application, this specification will govern.

As used herein, the expression "thermally-sensitive material" is intended in its broadest sense to generically include any material which is capable of fusing or bonding with a like or different material under the influence of a sufficient quantity of heat. Examples of such "thermally-sensitive materials" include, but are not limited to, suitable thermoplastic materials, such as polyvinyl, polyethylene, polypropylene, nylon, mylar, and the like. Similarly, the expression "substrate material" is intended broadly to include any suitable material arranged beneath the overlying thermally sensitive material, and might typically include, but is not limited to, a treated paper, or a suitable plastic of the type heretofore described.

The presently preferred embodiment of apparatus 10 has particular utility in closing or heat sealing bag-like packages containing surgical instruments and implements. However, it should be understood that such apparatus is not limited to this specific medical application, and may be utilized in other applications as well whenever it is desired to bond a thermally-sensitive material to a suitable substrate material.

Heat Sealing Apparatus 10

Referring initially to FIGS. 1 and 2, a preferred embodiment of heat sealing apparatus 10 is illustrated as including an enclosing cover 11 suitably mounted on a supporting frame (later described). This cover 11 includes a vertical left side panel 12 (FIG. 2) provided with a suitable handle (not shown), a vertical right side panel 13 provided with a handle 14, a forwardly-facing upwardly and rearwardly inclined recessed control panel 15, a horizontal shelf 16 extending forwardly from the lower marginal edge of the control panel, and upper and lower vertical front panels 18, 19 extending the full transverse width of the cover 11 from the left side panel to the right side panel. As best shown in FIG. 1, these two front panels 18, 19 are separated by a transversely-extending intermediate horizontal slot-like recess 20.

Referring now to FIG. 3, a horizontal plate-like member 21 is shown as being mounted on the upper marginal portion of lower front panel 19, and is further shown as extending rearwardly within the cover proximate slot 20. This plate-like member 21 provides a shelf-like surface along which the thermally-sensitive and substrate materials may slide as such materials are translated linearly between the heat sealing rollers (later described). This plate-like member 21 is shown as being further provided with an upstanding rear portion 22 which is adapted to provide a guide surface along which the edges of the thermally-sensitive and substrate materials may slide during the heat sealing operation. Moreover, the heat sealing rollers are spaced from the guide surface 22 so that a graspable flap will be provided between the marginal edges of the thermally-sensitive and substrate materials and the bonds created therebetween, to facilitate opening of the package.

Adverting now to FIGS. 2 and 3, the apparatus 10 is shown as further including a frame, generally indicated at 23, having a lower horizontal plate-like bottom member 24 provided with a plurality of rubber feet 25 adapted to rest on a suitable support, such as a table (not shown); a lower stationary portion, generally indicated at 26, mounted on the bottom member 24; and an upper movable portion generally indicated at 28, pivotally mounted on the lower stationary portion. As best shown in FIGS. 2 and 3, the frame lower stationary portion 26 is a transversely elongated member (FIG. 2) having an inverted substantially U-shaped crosssection (FIG. 3). The out-turned marginal flanges 29, 29 of this member are secured to the bottom member 24 by means of a plurality of fasteners 30. The frame upper movable portion 28 is shown as being a transversely-extending member having a U-shaped cross-section. As best shown in FIG. 2, the left marginal end portion 31 of the frame upper movable portion is pivotally mounted on the left marginal end portion 32 of the frame lower stationary portion 26. Referring now to FIG. 2, the frame upper portion 28 is provided with an adjustable stop member 33 which is adapted to engage the upper surface of the horizontal web of the frame lower portion to prevent further clockwise rotation of the frame upper portion. Moreover, as best shown in FIGS. 2 and 3, biasing means, such as a coil spring 34, operatively surrounds a vertical rod 35 mounted on the frame lower portion 26. This coil spring 34 is normally compressed between a nut 36, threaded onto the upper end of rod 35, and the web of the frame upper portion 28. Hence, this spring 34 functions to continuously urge the frame upper portion 28 to rotate in a clockwise direction, as seen in FIG. 2.

Adverting now to FIG. 3, a tubular first shaft, generally indicated at 38, is shown as being secured to the frame lower portion 26 and as penetrating an opening 39 therethrough. This first shaft 38 is shown as having an annular vertical rear face 40; an annular vertical front face 41; an outer surface including, from left to right in FIG. 3, an externally-threaded portion 42 extending forwardly from rear face 40, a rearwardly-facing annular vertical surface 43, a cylindrical surface 44, a forwardly-facing annular vertical surface 45, a cylindrical surface 46, a forwardly-facing annular vertical surface 48, and a cylindrical surface 49 continuing rightwardly therefrom to right end face 41; and a central longitudinal through-bore including, from left to right in FIG. 3, a cylindrical surface 50 extending forwardly from rear face 40, a forwardly-facing annular vertical surface 51, and a cylindrical surface 52 continuing forwardly to front face 41. This first shaft 38 is mounted on the frame lower portion 26 such that shaft surface 43 will abut the forwardly-facing surface of a thermally-insulating annular member 53, with a nut 54 threaded onto shaft threaded portion 42 to engage a flat washer 55. The first shaft assembly may be suitably secured to the frame, as by means of fasteners 47.

A cylindrical first heating element 56 is shown as being arranged within the first shaft with its electrical wires 58 extending out through the rear end thereof. If desired, these wires may be sealed in place by placement of a suitable potting compound, or equivalent, inserted into the rear end of the first shaft.

The apparatus is shown as further including a second tubular shaft 59 similarly mounted on the frame movable portion 28. Inasmuch as the structure of the second shaft 59 is identical to the structure of the first shaft 38, this second shaft will not be explicitly described. However, it should be noted that the various surfaces of the second shaft bear the same reference numerals as the corresponding surfaces of the first shaft. The second shaft 59 is operatively mounted fast to the upper frame portion 28 about frame opening 60 in the same manner as the first shaft 38 is mounted on the frame lower part 26.

A cylindrical second heating element 61 is shown as being operatively arranged in the second shaft with its electrical wires 62 extending out through the rear end thereof. As with the wires of the first shaft, these wires 62 may be secured in this position by means of a suitable potting compound inserted into the rear end of the second tubular shaft.

Still referring principally to FIG. 3, a first roller member, generally indicated at 63, is shown as being rotatably mounted on the first shaft 38, and a second roller member, generally indicated at 64, is rotatably mounted on the second shaft 59.

Inasmuch as many of the structural features of these two roller members 63, 64 are identical, the common features may be simultaneously described. Thus, each roller member has an annular vertical left face 65; an annular vertical right face 66; an outer surface including, from left to right in FIG. 3, a cylindrical surface 68 extending forwardly from rear face 65, a rearwardly-facing annular vertical surface 69, a cylindrical surface 70 continuing forwardly therefrom, a forwardly-divergent frusto-conical surface 71, a rearwardly-facing annular vertical surface 72, an outer peripheral surface 73, a forwardly-facing annular vertical surface 74, and a forwardly-convergent frusto-conical surface 75 continuing therefrom to join front face 66; and a central through-bore including, from left to right in FIG. 3, a cylindrical surface 76 extending rightwardly from rear face 65, a rearwardly-facing annular vertical surface 78, and a cylindrical surface 79 continuing forwardly therefrom to join front face 66. These roller members 63, 64 may be retained on their respective shafts by means of snap rings 80 proximate the distal ends thereof.

As best shown in FIGS. 2 and 3, a first toothed sprocket 81 is secured to the first roller member 63, by means of a threaded fastener 82, and a second toothed sprocket 83 is similarly secured to the second roller member. An endless flexible ladder chain 84 is operatively arranged to engage sprockets 81, 83, an idler sprocket 87, a tension-maintaining sprocket 85, and a driving sprocket 86 powered by a suitable motor. Hence, sprockets 81 and 83 are caused to rotate in opposite directions so that an article interposed at the nip between the peripheral surfaces 73, 73 of the two roller members, will be translated therebetween.

Roller Members 63, 64

The present invention provides an improved roller member for use in the heat sealing apparatus heretofore described. Three cooperative pairs of roller members according to the present invention are shown in FIGS. 4 and 5, 6 and 7, and 8 and 9, respectively.

Figure 4:
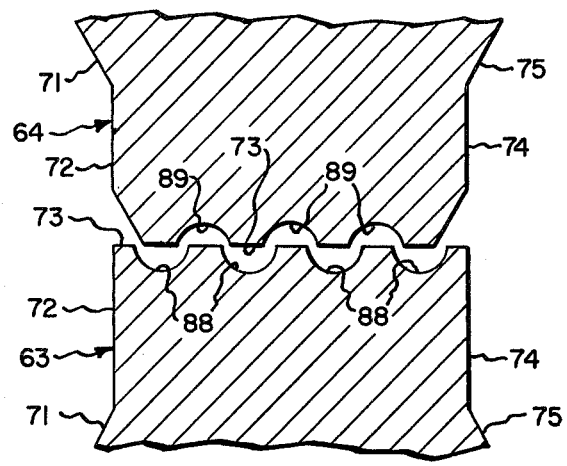
FIG. 4 is a greatly enlarged fragmentary vertical sectional view showing the cross-sectional configuration of a first pair of cooperative roller members.
Figure 5:
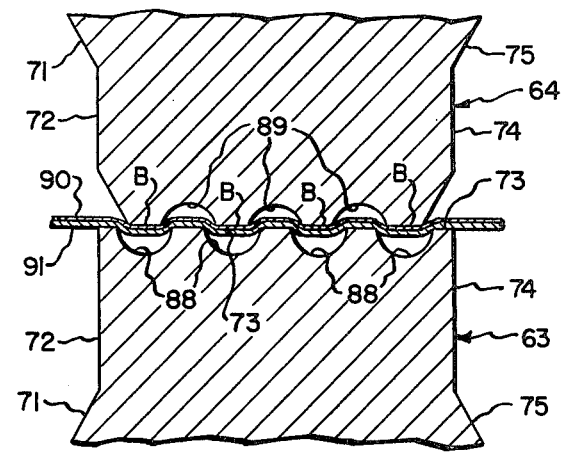
FIG. 5 is a view similar to FIG. 4 but showing portions of a thermally-sensitive material being bonded to a substrate material.

Referring initially to FIGS. 4 and 5, the operative peripheral surface 73 of the first roller member 63 is depicted as being cylindrical, and as having a plurality of longitudinally-spaced concave annular depressions or grooves 88 therein, four of these grooves being shown. The operative peripheral surface 73 of the second roller member 64 is also depicted as being cylindrical, and as having another plurality of longitudinally-spaced concave annular depressions or grooves 89 therein, three of these grooves being shown. However, it should be noted that the peaks of the second roller member are adapted to be aligned with the valleys of the first roller member. This embodiment is particularly adapted to bond a mylar sheet 90, this being one thermally-sensitive material, to a treated paper substrate material 91. When the mylar and paper sheets are translated between the roller members, the cylindrical surfaces 73 adjacent the peaks of the second roller member will engage the mylar and slightly deform the laminate. At the same time, it should be noted that the cylindrical surfaces 73 adjacent the peaks of the first roller members will engage the treated-paper substrate. The slight deformation of the mylar and paper, as shown in FIG. 5, insures a degree of frictional contact between each material and its associated roller member. Moreover, the four heated peaks of the second roller member will each create a bond between a proximate portion of the mylar and the paper, these four ribbon-like bonds being severally indicated at B. At the same time, it has been found that the pair of cooperative roller members depicted in FIGS. 4 and 5 do not tend to propagate a bubble along the length of the seals, which might otherwise impair the integrity of the seals.

Figure 6:
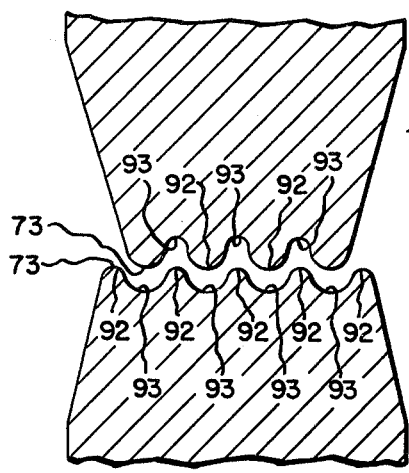
FIG. 6 is a greatly enlarged fragmentary vertical sectional view showing the cross-sectional configuration of a second pair of cooperative roller members.
Figure 7:
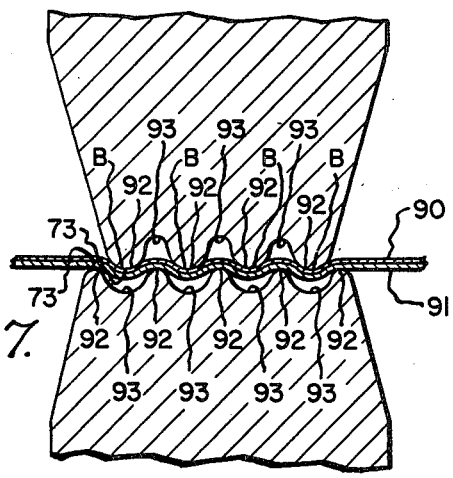
FIG. 7 is a view similar to FIG. 6, but showing portions of a thermally-sensitive material being bonded to a substrate material.

The second preferred pair of cooperative roller members illustrated in FIGS. 6 and 7 are generally similar to the pair of roller members depicted in FIGS. 4 and 5, except that the peripheral surfaces 73 of the roller members are depicted as being in smooth continuous undulating crosssection, which appears to be substantially sinusoidal. As with the previous embodiment, the embodiment shown in FIGS. 6 and 7 provides a plurality of convex peaks 92 on one roller member which are aligned with a corresponding plurality of valleys 93 on the other roller member. When the mylar and paper substrate are translated between the roller members, the peaks of the second roller engage the mylar and bond the same to the paper substrate at four ribbon-like places, these bonds being severally indicated at B in FIG. 7. This embodiment is also preferred for its inhibition of the propagation of a bubble along the length of the bonds.

Figure 8:
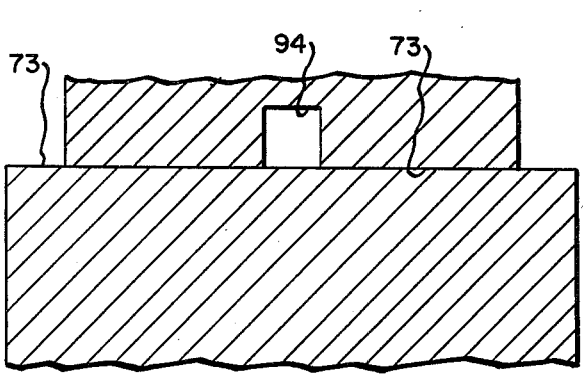
FIG. 8 is a greatly enlarged fragmentary vertical sectional view showing the cross-sectional configuration of a third pair of cooperative roller members.
Figure 9:
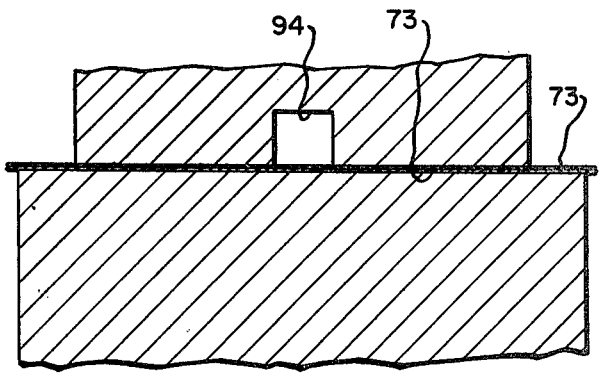
FIG. 9 is a view similar to FIG. 8, but showing portions of a thermally-sensitive material being bonded to a thermally-sensitive substrate material.

The third cooperative pair of roller members depicted in FIGS. 8 and 9 are particularly suited for bonding two low temperature thermally-sensitive materials, such as polyethylene, together. In this embodiment, the first roller member has a cylindrical peripheral surface 73, and the peripheral surface 73 of the second roller member is also cylindrical but provided with an intermediate annular groove 94 having a substantially rectangular cross-section.

In each of the foregoing embodiments, the heating elements within the shafts serve to provide a source of heat which is transmitted to the outer peripheral surface of the roller members for use in bonding the thermally-sensitive material to the substrate material. It has been found that the heating elements for the upper and lower rollers should be about 85 watts and 150 watts, respectively, although persons skilled in this art will appreciate that the Wattage required for such heating elements will depend in large part on the particular materials to be bonded. The inventive rollers may also be used to bond mylar which has been provided with a suitable film of polyethylene, for example, to a substrate material.

Therefore, while several preferred embodiments of the present invention have been shown and described, persons skilled in this art will recognize that various changes and modifications may be made without departing from the spirit of the invention which is generically defined by the following claims.

What is claimed is:

1. In apparatus for heat sealing a thermally-sensitive material to a substrate material, said apparatus having a frame, having a tubular first shaft mounted fast to said frame and arranged to be heated by a first heating element arranged within said first shaft, and having a second shaft mounted fast to said frame, the improvement comprising:

a first roller member rotatably mounted on said first shaft and having a first outer peripheral surface, said first roller member being adapted to conduct heat from said first shaft to said first peripheral surface, a portion of said first peripheral surface defining at least one annular groove extending radially into said first roller member;

a second roller member rotatably mounted on said second shaft and having a second outer peripheral surface arranged to face said first peripheral surface, a portion of said second peripheral surface forming an annular peak aligned with said groove; and biasing means mounted on said frame for urging said first and second peripheral surfaces to move toward one another with such force that said thermally-sensitive and substrate materials will contact said roller members in the vicinity of said first and second peripheral surfaces but will not contact said first roller member in the vicinity of the depth of said annular groove, and wherein the portion of said second surface forming said peak is spaced from the portion of said first surface defining said groove in the absence of said materials therebetween;

whereby, when said materials are translated between said roller members, less heat may be supplied in the vicinity of said groove than in the vicinity of said peak.

2. The improvement as set forth in claim 1 wherein said first roller member has a plurality of such annular grooves spaced longitudinally from one another.

3. The improvement as set forth in claim 1 wherein said portion of said first peripheral surface defining said groove has a substantially U-shaped longitudinal cross-section.

4. The improvement as set forth in claim 1 wherein the surface of said first roller member defining said groove is concave in longitudinal cross-section.

5. The improvement as set forth in claim 1 wherein said second shaft is tubular, wherein a second heating element is operatively arranged within said second shaft, and wherein said second roller member is adapted to conduct heat from said second shaft to said second peripheral surface.

6. The improvement as set forth in claim 11 wherein a portion of said second peripheral surface defines at least one annular groove extending radially into said second roller member, and wherein a portion of said first peripheral surface forms an annular peak aligned with such second roller member groove, whereby when said second peripheral surface is brought into proximity with one of said materials, less heat may be supplied to such material in the vicinity of said second roller member groove than in the vicinity of said first roller member peak.

7. The improvement as set forth in claim 6 wherein each of said second roller member grooves is offset longitudinally from each of said first roller member grooves.

8. The improvement as set forth in claim 6 wherein the surfaces of said second roller member which define said grooves are concave in longitudinal cross-section.

9. The improvement as set forth in claim 6 wherein said first peripheral surface is provided with a plurality of longitudinally-spaced grooves extending radially into said first roller member, wherein said second peripheral surface is provided with a plurality of longitudinally-spaced grooves extending into said second roller member, and wherein portions of said first peripheral surface between said first roller member grooves are aligned with the grooves in the second roller member.

* * * * *